United States Patent
Harada et al.

(10) Patent No.: US 12,281,709 B2
(45) Date of Patent: Apr. 22, 2025

(54) PISTON RING AND BOOSTER PUMP

(71) Applicants: MITSUBISHI HEAVY INDUSTRIES, LTD., Tokyo (JP); KABUSHIKI KAISHA RIKEN, Tokyo (JP)

(72) Inventors: Motoshi Harada, Tokyo (JP); Kenji Nakamichi, Tokyo (JP); Yuichi Kihara, Tokyo (JP); Kimihiko Mitsuda, Tokyo (JP); Hideaki Asai, Tokyo (JP); Jun Fukada, Tokyo (JP); Daisuke Hirayama, Tokyo (JP)

(73) Assignees: MITSUBISHI HEAVY INDUSTRIES, LTD., Tokyo (JP); KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 18/706,912

(22) PCT Filed: Jun. 15, 2022

(86) PCT No.: PCT/JP2022/024036
§ 371 (c)(1),
(2) Date: May 2, 2024

(87) PCT Pub. No.: WO2023/079784
PCT Pub. Date: May 11, 2023

(65) Prior Publication Data
US 2024/0337316 A1    Oct. 10, 2024

(30) Foreign Application Priority Data
Nov. 8, 2021 (JP) ................................. 2021-181938

(51) Int. Cl.
*F16J 9/24*            (2006.01)
(52) U.S. Cl.
CPC ...................................... *F16J 9/24* (2013.01)

(58) Field of Classification Search
CPC .. F16J 9/06; F16J 9/12; F16J 9/14; F16J 9/24
See application file for complete search history.

(56) References Cited

U.S. PATENT DOCUMENTS

| | | | |
|---|---|---|---|
| 1,510,778 A | * | 10/1924 | Hart .......................... F16J 1/08 |
| | | | 277/498 |
| 2,537,721 A | | 1/1951 | Walker |

(Continued)

FOREIGN PATENT DOCUMENTS

| | | |
|---|---|---|
| EP | 3 715 678 A1 | 9/2020 |
| JP | 63-83475 U | 6/1988 |

(Continued)

OTHER PUBLICATIONS

International Search Report dated Aug. 23, 2022, issued in counterpart International Application No. PCT/JP2022/024036, with English Translation. (5 pages).

(Continued)

*Primary Examiner* — Nicholas L Foster
(74) *Attorney, Agent, or Firm* — WHDA, LLP

(57) ABSTRACT

Provided is a piston ring including: a low-pressure side ring; and a high-pressure side ring, the low-pressure side ring and the high-pressure side ring are arranged stacked in a direction along the axis so that the high-pressure side ring is closer to a fluid to be compressed, a low-pressure side rotation restriction part configured to restrict rotation in the circumferential direction relative to the piston is formed to the low-pressure side ring, a high-pressure side rotation restriction part configured to restrict rotation in the circumferential direction relative to the piston and a low-pressure side protrusion protruding toward the low-pressure side ring and inserted in the low-pressure side abutment are formed to the high-pressure side ring, and the low-pressure side protrusion is inserted in a low-pressure side abutment with (Continued)

clearances being provided in both sides in the circumferential direction between the low-pressure side ring and the low-pressure side protrusion.

7 Claims, 17 Drawing Sheets

(56) References Cited

U.S. PATENT DOCUMENTS

| | | | | |
|---|---|---|---|---|
| 2,767,038 | A | * | 10/1956 | Brown .................. F16J 9/08 |
| | | | | 74/38 |
| 3,391,943 | A | * | 7/1968 | Riley .................. F16J 9/063 |
| | | | | 277/488 |
| 4,962,691 | A | * | 10/1990 | Kanao .................. F16J 9/24 |
| | | | | 123/193.6 |
| 6,378,872 | B1 | * | 4/2002 | Moriarty .................. F16J 9/16 |
| | | | | 277/435 |
| 9,541,198 | B2 | * | 1/2017 | Hofbauer .................. F16J 9/16 |
| 2006/0249913 | A1 | * | 11/2006 | Nessa .................. F16J 9/16 |
| | | | | 277/493 |
| 2014/0298984 | A1 | * | 10/2014 | Hofbauer .................. F16J 9/16 |
| | | | | 92/169.1 |
| 2021/0180694 | A1 | | 6/2021 | Steffen |

FOREIGN PATENT DOCUMENTS

| | | |
|---|---|---|
| JP | 5-58879 U | 8/1993 |
| JP | 11-63226 A | 3/1999 |
| JP | 2000-352464 A | 12/2000 |
| JP | 2012-117393 A | 6/2012 |
| JP | 2017-155843 A | 9/2017 |
| WO | 2020/157834 A1 | 8/2020 |
| WO | 2021/127695 A1 | 6/2021 |

OTHER PUBLICATIONS

Decision to Grant a Patent dated Jan. 11, 2023, issued in counterpart of Japanese Patent Application No. 2021-181938, with English Translation. (5 pages).

Extended (Supplementary) European Search Report dated Sep. 12, 2024, issued in counterpart EP Application No. 22889609.8. (12 pages).

* cited by examiner

PISTON RING AND BOOSTER PUMP

TECHNICAL FIELD

The present disclosure relates to a piston ring and a booster pump attached to a piston configured to compress a fluid.

BACKGROUND ART

Piston rings having a low-pressure side ring and a high-pressure side ring arranged stacked in two layers in a reciprocating direction of a piston are conventionally known as a piston ring attached to a piston used for a reciprocating pump or the like (for example, see Patent Literature 1). In the piston ring disclosed in Patent Literature 1, a protrusion of the high-pressure side ring is inserted in an abutment of the low-pressure side ring, and a protrusion of the low-pressure side ring is inserted in an abutment of the high-pressure side ring. According to the piston ring disclosed in Patent Literature 1, since the protrusions enter the abutments, leakage of a fluid through the abutments is suppressed, and the fluid-tightness of the piston ring is improved.

CITATION LIST

Patent Literature

[PTL 1]
Japanese Patent Application Laid-Open No. 2012-117393

SUMMARY OF INVENTION

Technical Problem

In the piston ring disclosed in Patent Literature 1, the high-pressure side ring and the low-pressure side ring are attached to a ring groove so as to be movable in the circumferential direction of the piston ring, respectively. Thus, the protrusion of the high-pressure side ring may be arranged shifted to one side in the circumferential direction in the abutment of the low-pressure side ring, and in such a case, a clearance formed on the other side in the circumferential direction in the abutment of the low-pressure side ring increases. If a pressure of a fluid compressed by the piston works on a region of the high-pressure side ring arranged in this clearance, the working pressure is unable to be transmitted to the low-pressure side ring, and this may cause stress concentration and lead to a fatigue failure.

The present disclosure has been made in view of such circumstances and intends to provide a piston ring and a booster pump that can prevent a low-pressure side protrusion of a high-pressure side ring inserted in a low-pressure side abutment of a low-pressure side ring from being arranged shifted circumferentially to one side and thereby prevent a fatigue failure due to stress concentration in some region of the high-pressure side ring.

Solution to Problem

A piston ring according to one aspect of the present disclosure is a piston ring to be attached to a piston, the piston being formed in a cylindrical shape along an axis and configured to reciprocate along the axis to compress a fluid, the piston ring includes: a low-pressure side ring inserted in a groove formed in an outer circumferential face of the piston, formed in an annular shape extending in a circumferential direction about the axis, and having a low-pressure side abutment; and a high-pressure side ring inserted in the groove, formed in an annular shape extending in the circumferential direction, and having a high-pressure side abutment. The low-pressure side ring and the high-pressure side ring are arranged stacked in a direction along the axis so that the high-pressure side ring is closer to a fluid to be compressed, a low-pressure side rotation restriction part configured to restrict rotation in the circumferential direction relative to the piston is formed to the low-pressure side ring, a high-pressure side rotation restriction part configured to restrict rotation in the circumferential direction relative to the piston and a low-pressure side protrusion protruding toward the low-pressure side ring and inserted in the low-pressure side abutment are formed to the high-pressure side ring, and the low-pressure side protrusion is inserted in the low-pressure side abutment with clearances being provided in both sides in the circumferential direction between the low-pressure side ring and the low-pressure side protrusion.

Advantageous Effects of Invention

According to the present disclosure, it is possible to provide a piston ring and a booster pump that can prevent a low-pressure side protrusion of a high-pressure side ring inserted in a low-pressure side abutment of a low-pressure side ring from being arranged shifted circumferentially to one side and thereby prevent a fatigue failure due to stress concentration in some region of the high-pressure side ring.

DESCRIPTION OF EMBODIMENTS

First Embodiment

Figure 1:
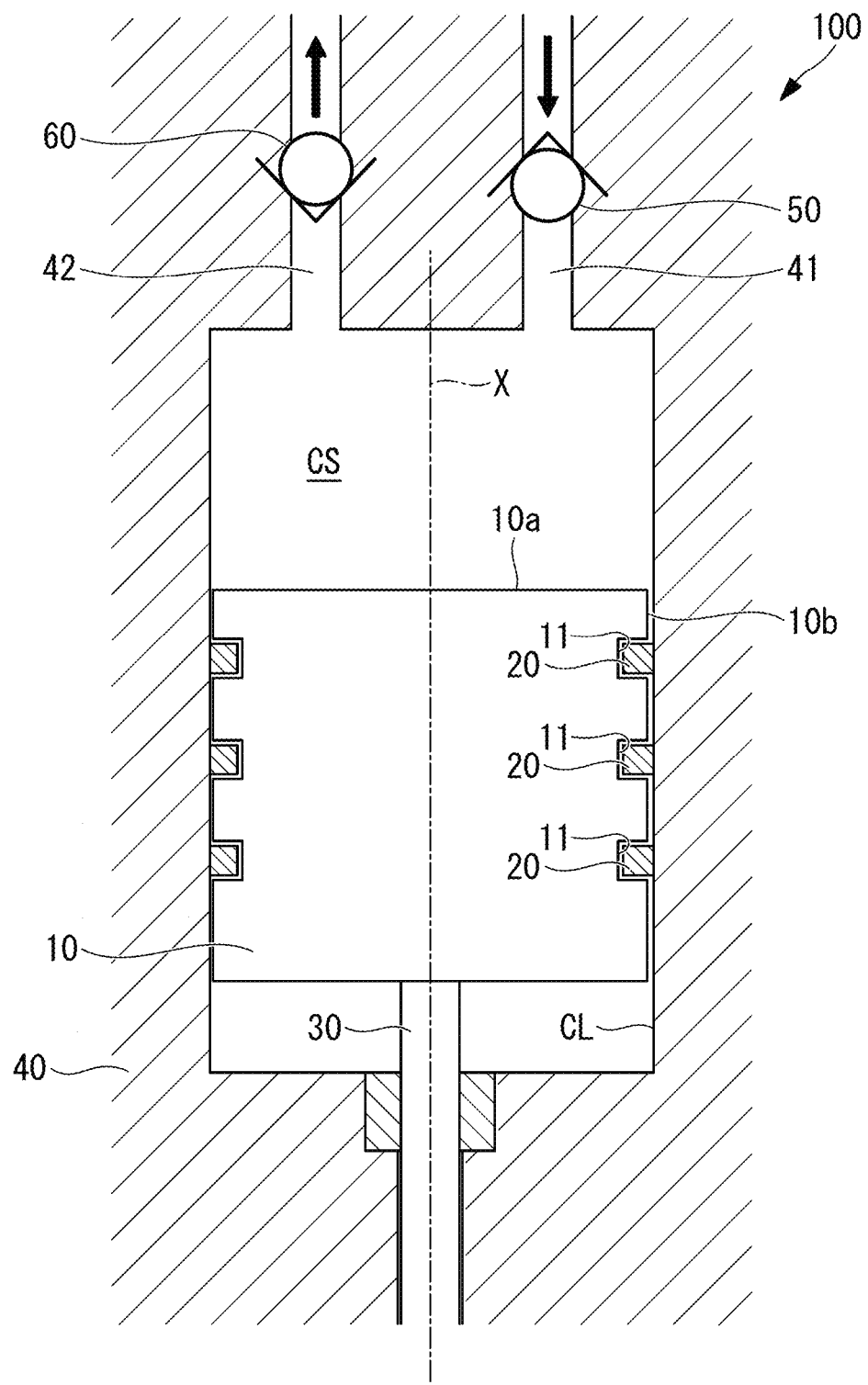
FIG. 1 is a longitudinal sectional view illustrating a booster pump according to a first embodiment of the present disclosure.

A booster pump 100 according to a first embodiment of the present disclosure will be described below with reference to the drawings. FIG. 1 is a longitudinal sectional view illustrating the booster pump 100 according to the present embodiment. The booster pump 100 of the present embodiment is a device that compresses a fluid at a low temperature (for example, from −253° C. to −100° C.) (for example, liquid hydrogen, liquid nitrogen, liquid argon, liquefied natural gas, or the like) to boost the pressure thereof. As illustrated in FIG. 1, the booster pump 100 of the present embodiment includes a piston 10, piston rings 20, a piston rod 30, a cylinder block 40, a check valve 50, and a check valve 60.

The piston 10 is a member that reciprocates along the axis X to compress a fluid inside a cylinder CL formed inside the cylinder block 40. The piston 10 is formed in a cylindrical shape so as to extend along the axis X. The piston 10 compresses a low temperature fluid by reducing the volume of a compression chamber CS defined by an end face 10a and the cylinder CL.

The piston rings 20 are members inserted in a plurality of grooves 11 formed in the outer circumferential face 10b of the piston 10 facing the inner circumferential face of the cylinder CL. Each piston ring 20 is formed in an annular shape extending circumferentially about the axis X. The piston ring 20 forms an annular seal region between the inner circumferential face of the cylinder CL and the piston ring 20 and, when the piston 10 is reciprocating, prevents a compressed low temperature fluid from leaking out from the high-pressure side (the compression chamber CS side) to the low-pressure side (the piston rod 30 side). The detailed structure of the piston ring 20 will be described later.

The piston rod 30 is a bar-like member whose cross section is circular, one end thereof is connected to the piston 10, and the other end thereof is connected to a drive unit (not illustrated). The drive unit causes the piston rod 30 to reciprocate linearly along the axis X with motive power from the drive source.

The cylinder block 40 is a member having a hollow cylindrical cylinder CL therein. The compression chamber CS of the cylinder CL is provided with an inflow port 41 into which a low temperature fluid at a pressure near the atmospheric pressure flows and an outflow port 42 out of which a low temperature fluid compressed in the compression chamber CS flows. The inflow port 41 is provided with the check valve 50 that permits communication of a low temperature fluid in the inflow direction illustrated in FIG. 1 (the direction toward the compression chamber CS) and blocks communication in the reverse direction. The outflow port 42 is provided with the check valve 60 that permits communication of a low temperature fluid in the outflow direction illustrated in FIG. 1 (the direction away from the compression chamber CS) and blocks communication in the reverse direction.

The booster pump 100 of the present embodiment compresses a low temperature fluid flowing in from the inflow port 41 in the compression chamber CS and supplies the compressed low temperature fluid to outside from the outflow port 42 by using the piston 10 attached to the piston rod 30 driven by the drive unit to reciprocate.

Figure 2:
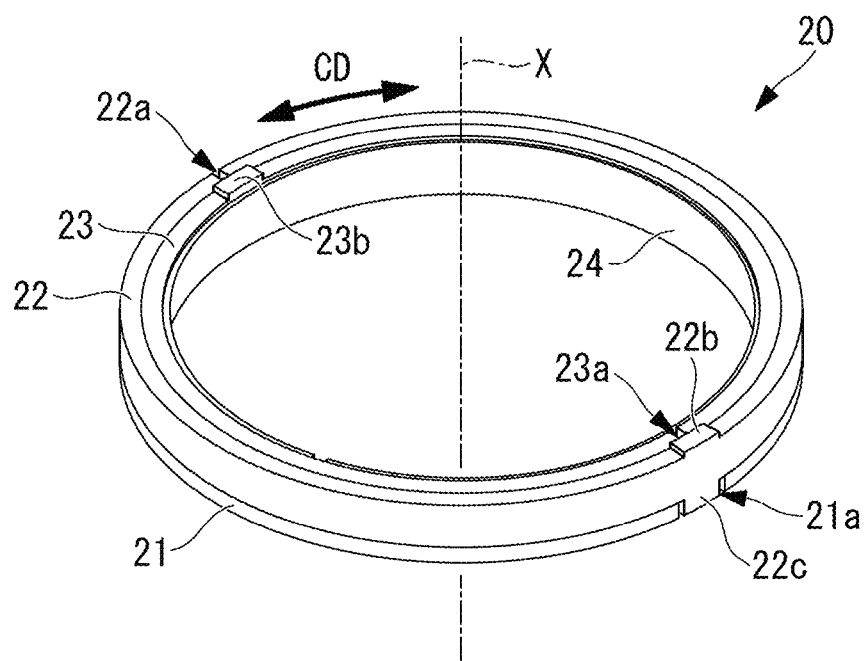
FIG. 2 is a perspective view of a piston ring illustrated in FIG. 1 when viewed from a high-pressure side ring side.
Figure 3:
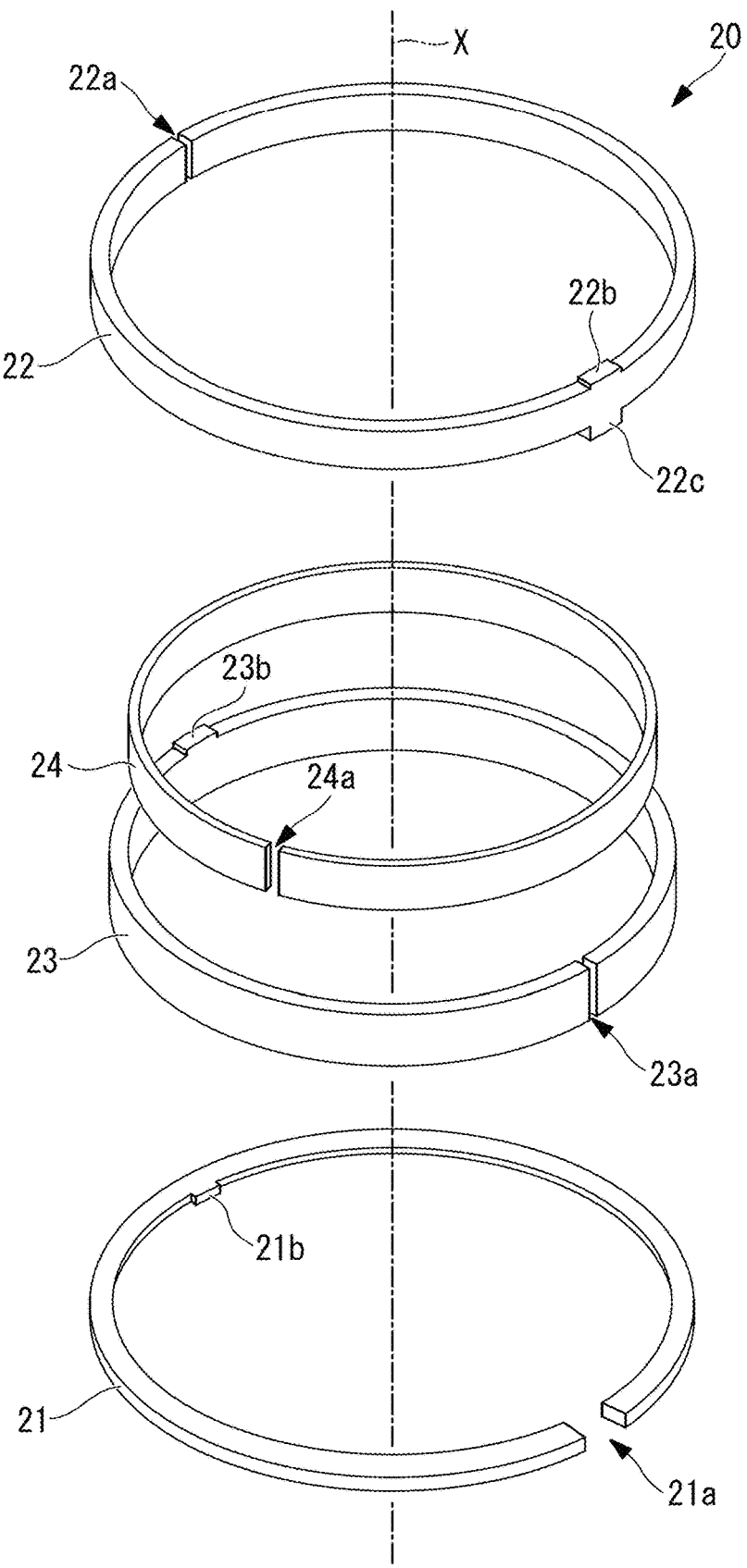
FIG. 3 is an exploded perspective view of the piston ring illustrated in FIG. 2.
Figure 4:
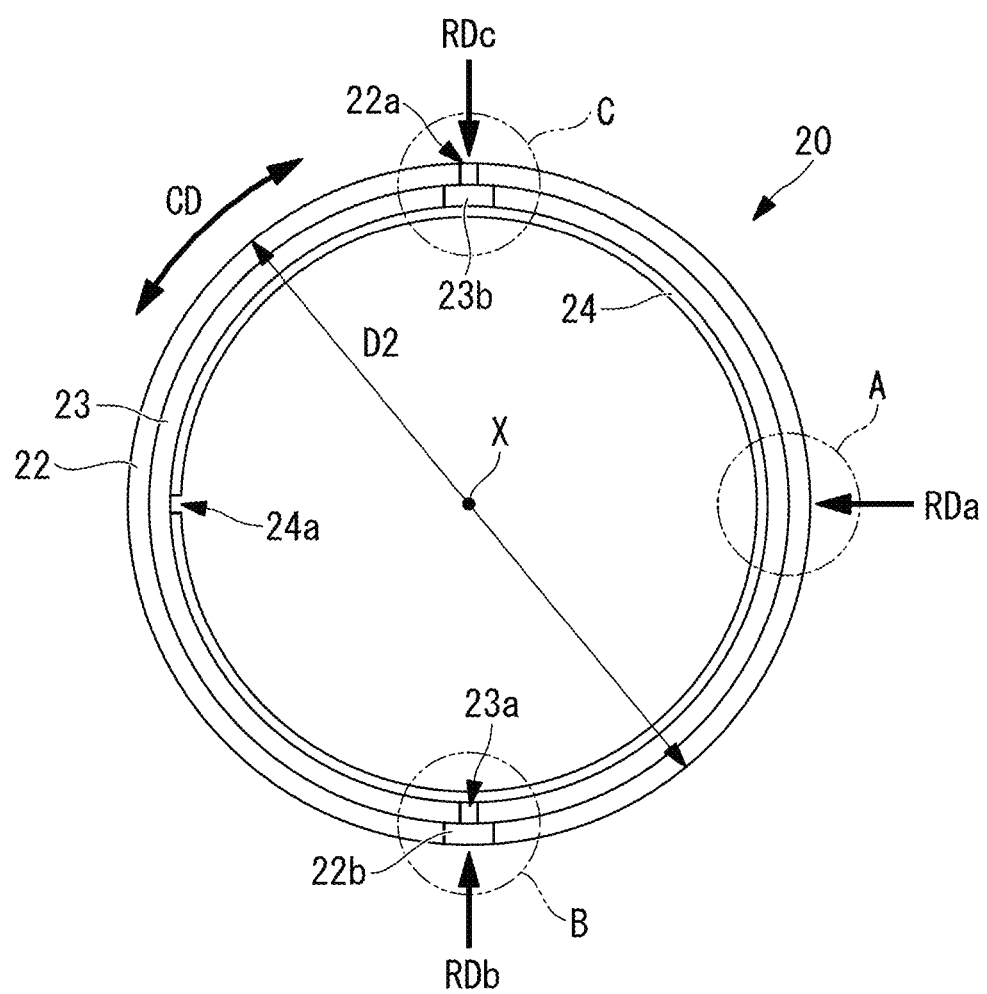
FIG. 4 is a plan view of the piston ring illustrated in FIG. 2 when viewed from the high-pressure side ring side.
Figure 5:
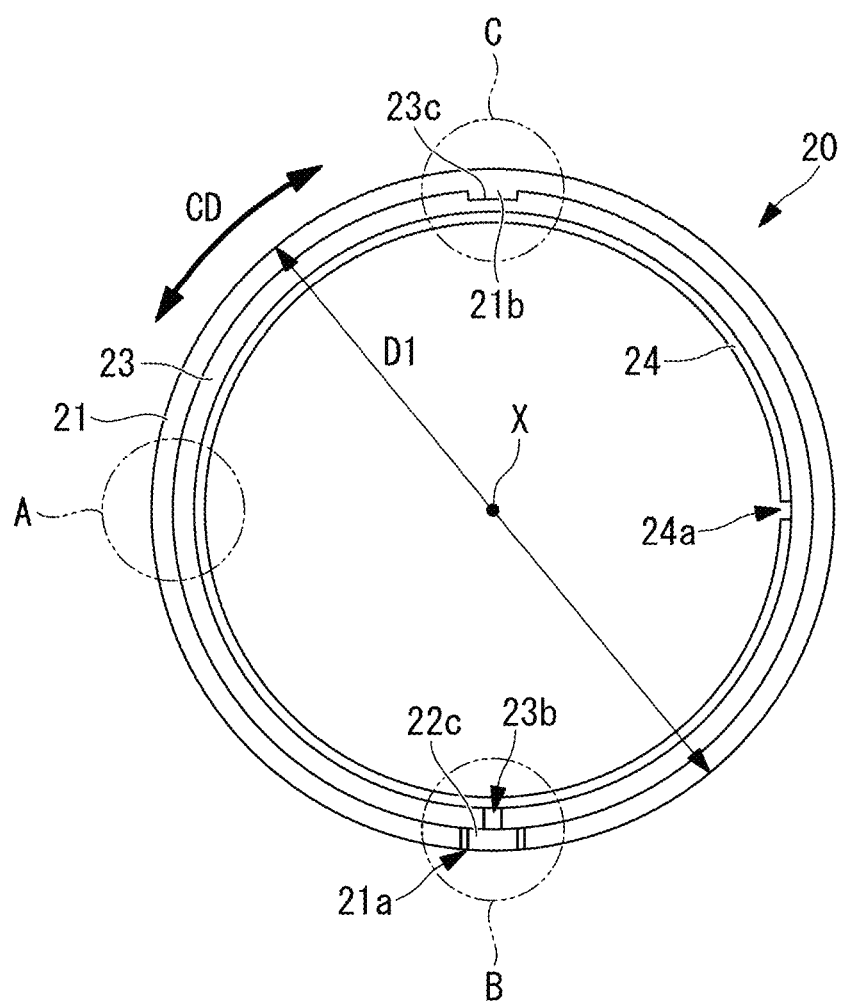
FIG. 5 is a plan view of the piston ring illustrated in FIG. 2 when viewed from a low-pressure side ring side.

Next, the detailed structure of the piston ring 20 will be described with reference to the drawings. FIG. 2 is a perspective view of the piston ring 20 illustrated in FIG. 1 when viewed from a high-pressure side ring 22 side. FIG. 3 is an exploded perspective view of the piston ring 20 illustrated in FIG. 2. FIG. 4 is a plan view of the piston ring 20 illustrated in FIG. 2 when viewed from the high-pressure side ring 22 side. FIG. 5 is a plan view of the piston ring 20 illustrated in FIG. 2 when viewed from a low-pressure side ring 21 side.

Figure 6:
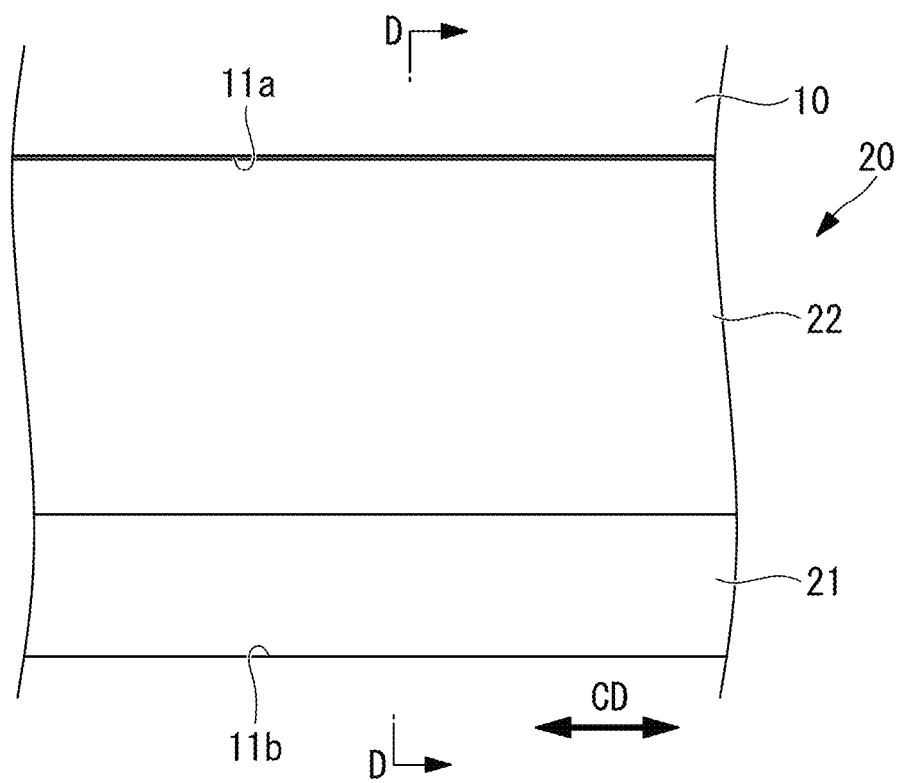
FIG. 6 is a diagram of a portion A illustrated in FIG. 4 when viewed along a radial direction of the piston ring.
Figure 7:
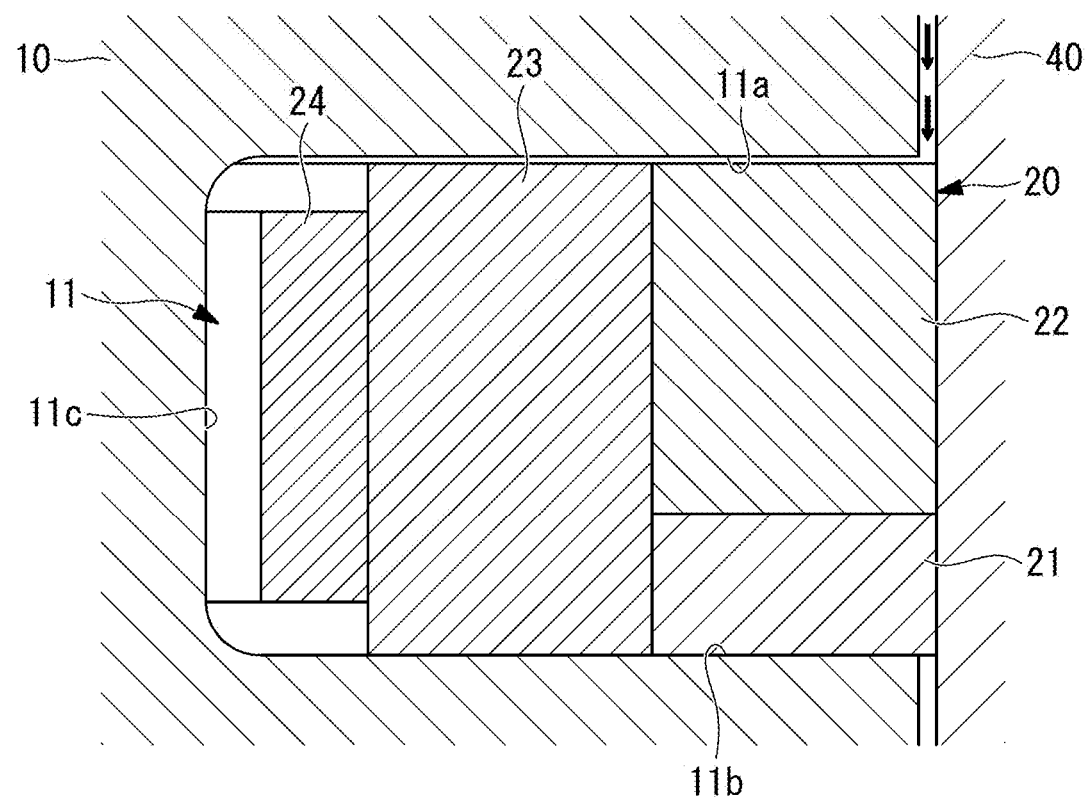
FIG. 7 is an arrow D-D sectional view of the piston ring illustrated in FIG. 6.
Figure 8:
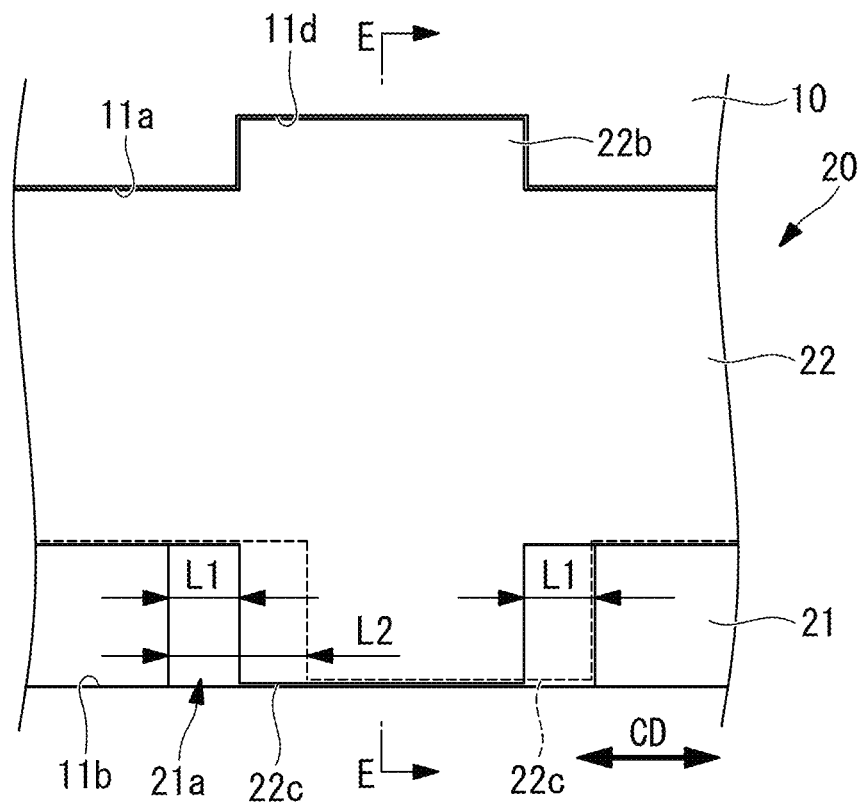
FIG. 8 is a diagram of a portion B illustrated in FIG. 4 when viewed along a radial direction of the piston ring.
Figure 9:
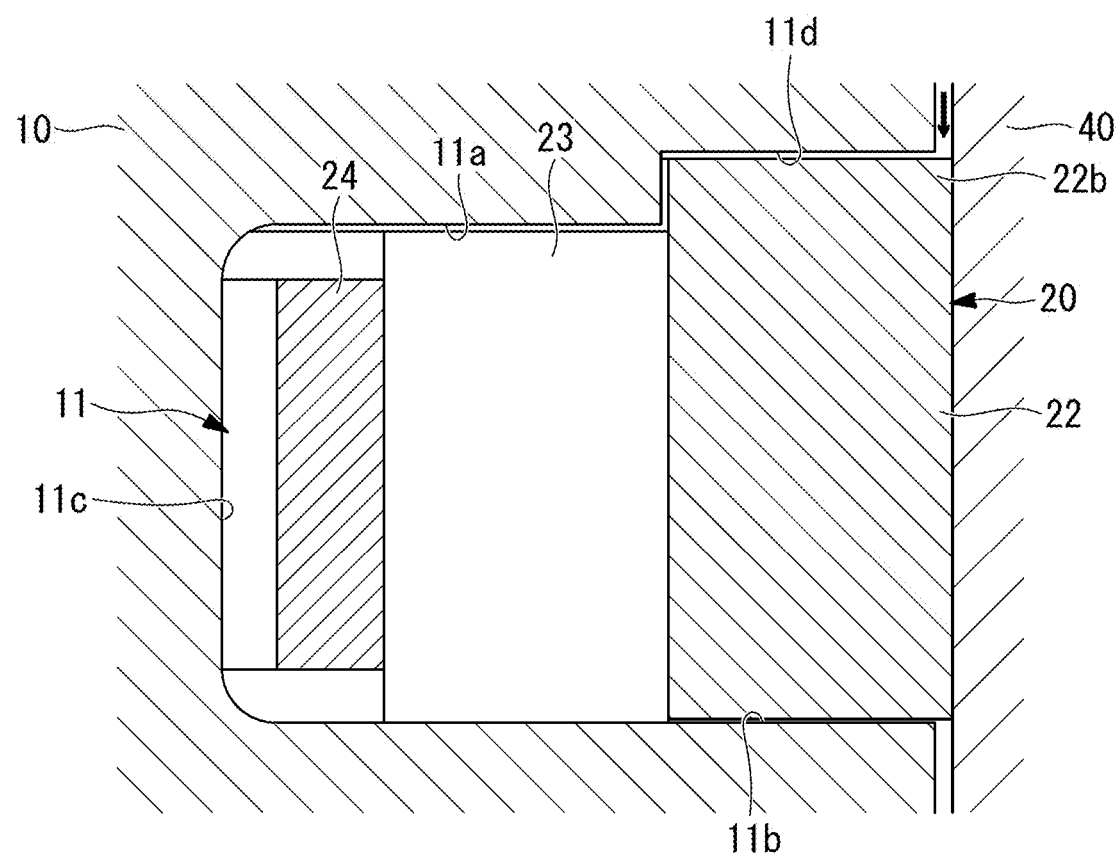
FIG. 9 is an arrow E-E sectional view of the piston ring illustrated in FIG. 8.

FIG. 6 is a diagram of a portion A illustrated in FIG. 4 when viewed along a radial direction RDa of the piston ring 20. FIG. 7 is an arrow D-D sectional view of the piston ring 20 illustrated in FIG. 6. FIG. 8 is a diagram of a portion B illustrated in FIG. 4 when viewed along a radial direction RDb of the piston ring 20. FIG. 9 is an arrow E-E sectional view of the piston ring 20 illustrated in FIG. 8.

Figure 10:
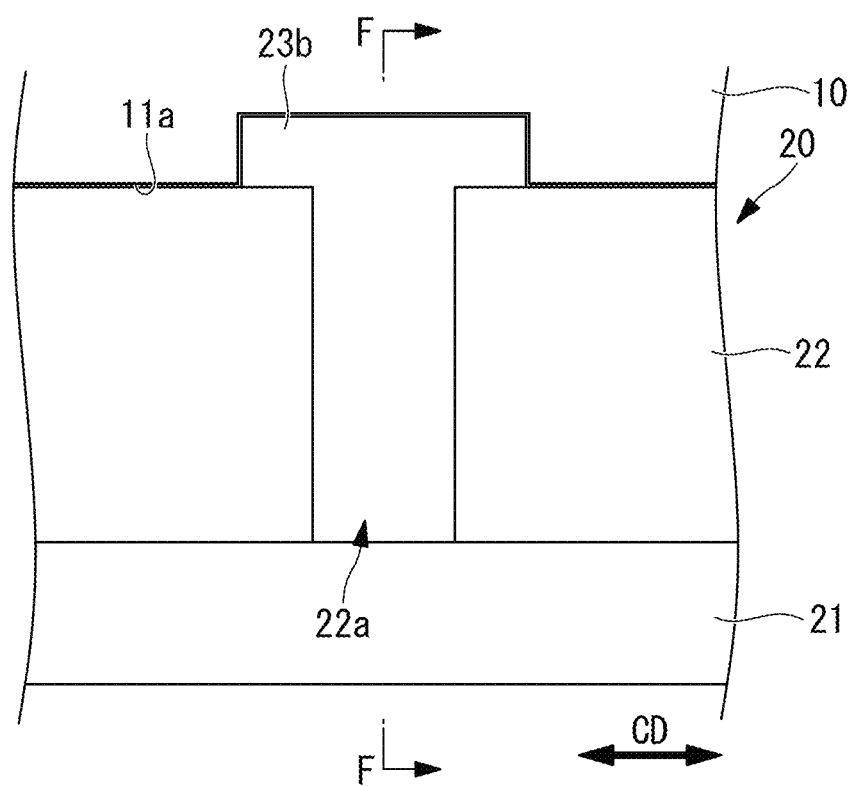
FIG. 10 is a diagram of a portion C illustrated in FIG. 4 when viewed along a radial direction of the piston ring.
Figure 11:
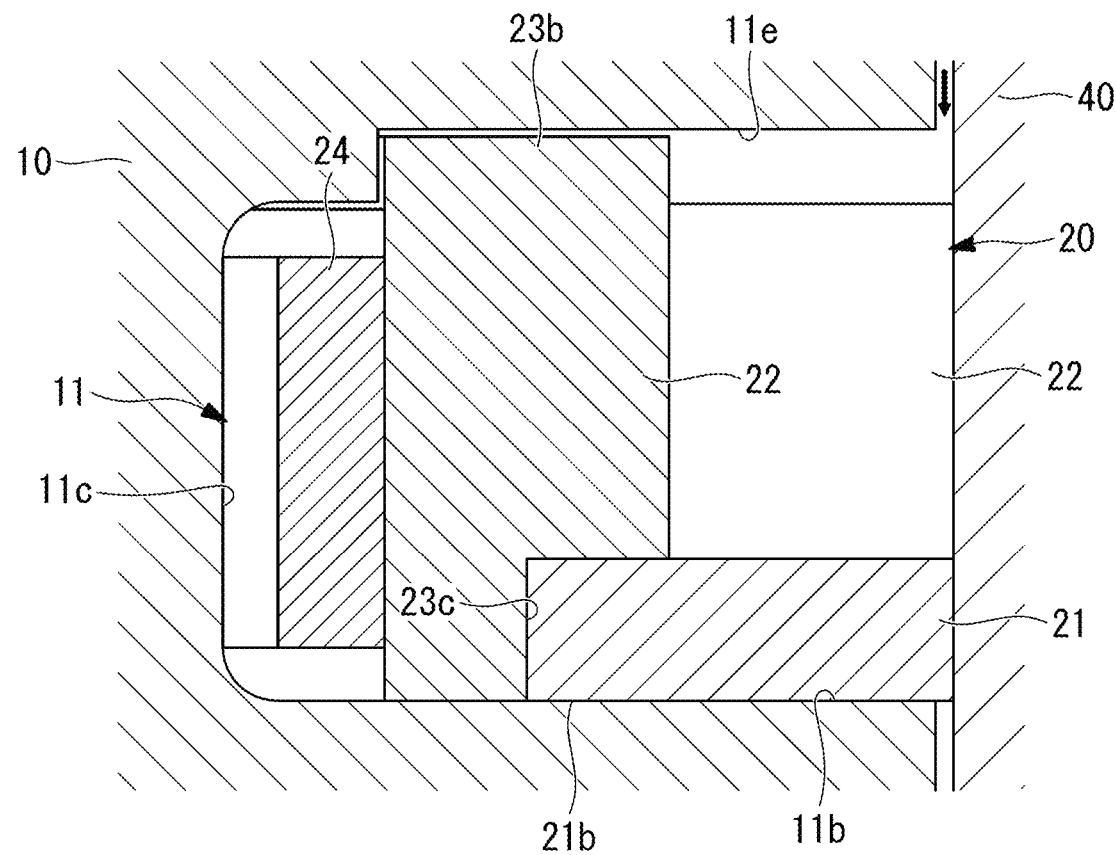
FIG. 11 is an arrow F-F sectional view of the piston ring illustrated in FIG. 10.

FIG. 10 is a diagram of a portion C illustrated in FIG. 4 when viewed along a radial direction RDc of the piston ring 20. FIG. 11 is an arrow F-F sectional view of the piston ring 20 illustrated in FIG. 10. The arrows illustrated in sectional views of FIG. 7, FIG. 9, and FIG. 11 indicate inflow directions of a fluid flowing from the compression chamber CS into the groove 11. The arrows illustrated in sectional views of FIG. 15 and FIG. 17 described later also indicate inflow directions of the fluid flowing from the compression chamber CS into the groove 11.

As illustrated in FIG. 2 and FIG. 3, the piston ring 20 of the present embodiment is attached to the groove 11 of the piston 10 and includes the low-pressure side ring 21, the high-pressure side ring 22, an inner ring 23, and a backup ring 24. As illustrated in FIG. 2 and FIG. 3, the piston ring 20 of the present embodiment is formed such that the low-pressure side ring 21 and the high-pressure side ring 22 stacked along the axis X are arranged on the outer circumferential side, the inner ring 23 is arranged inside thereof, and the backup ring 24 is arranged further inside the inner ring 23, all of which are integrated.

As illustrated in FIG. 2, the low-pressure side ring 21 and the high-pressure side ring 22 are arranged stacked in the direction along the axis X. The high-pressure side ring 22 is arranged on the side closer to the compression chamber CS than the low-pressure side ring 21 so as to be closer to a compressed fluid. The outer diameter D1 of the low-pressure side ring 21 illustrated in FIG. 5 matches the outer diameter D2 of the high-pressure side ring 22 illustrated in FIG. 4.

The low-pressure side ring 21, the high-pressure side ring 22, and the inner ring 23 are formed of a resin material such as polyetheretherketone (PEEK) or polytetrafluoroethylene (PTFE). The backup ring 24 is formed of a metal material such as stainless.

The low-pressure side ring 21 is a member inserted in the groove 11 formed in the outer circumferential face 10b of the piston 10 and formed in an annular shape extending in the circumferential direction CD about the axis X. The groove 11 of the piston 10 is formed annularly about the axis X. As illustrated in FIG. 7, the groove 11 has a high-pressure side side-face 11a, a low-pressure side side-face 11b, and a bottom face 11c.

As illustrated in FIG. 3, the low-pressure side ring 21 has a low-pressure side abutment 21a whose arrangement is defined by a pair of ends of the low-pressure side ring 21 that are spaced apart from and face each other with a clearance therebetween in the circumferential direction CD. The low-pressure side ring 21 is subjected to radially outward pushing force from the inner ring 23 and thereby comes into contact with the inner circumferential face of the cylinder CL.

As illustrated in FIG. 3 and FIG. 5, a low-pressure side rotation restriction part 21b that restricts rotation in the circumferential direction CD relative to the piston 10 is formed to the low-pressure side ring 21. The low-pressure side rotation restriction part 21b has a shape protruding from the inner circumferential face of the low-pressure side ring 21 toward the outer circumferential face of the inner ring 23 and engages with a recess 23c formed in the outer circumferential face of the inner ring 23. As illustrated in FIG. 5, the low-pressure side rotation restriction part 21b is arranged at a position distant by 180 degrees in the circumferential direction CD from the low-pressure side abutment 21a.

As described later, the inner ring 23 is arranged so as not to rotate about the axis X with respect to the piston 10. Thus, once the low-pressure side rotation restriction part 21b engages with the recess 23c of the inner ring 23, the low-pressure side ring 21 is restricted so as not to rotate in the circumferential direction CD about the axis X with respect to the piston 10. Accordingly, the position in the circumferential direction CD of the low-pressure side ring 21 is fixed with respect to the piston 10.

The high-pressure side ring 22 is a member inserted in the groove 11 formed in the outer circumferential face 10b of the piston 10 and formed in an annular shape extending in the circumferential direction CD about the axis X. As illustrated in FIG. 3, the high-pressure side ring 22 has a high-pressure side abutment 22a whose arrangement is defined by a pair of ends of the high-pressure side ring 22 that are spaced apart from and face each other with a clearance therebetween in the circumferential direction CD. The high-pressure side ring 22 is subjected to radially outward pushing force from the inner ring 23 and thereby comes into contact with the inner circumferential face of the cylinder CL.

As illustrated in FIG. 3 and FIG. 4, a high-pressure side rotation restriction part 22b that restricts rotation in the circumferential direction CD relative to the piston 10 is formed to the high-pressure side ring 22. As illustrated in FIG. 8 and FIG. 9, the high-pressure side rotation restriction part 22b has a shape protruding toward the high-pressure side side-face 11a of the groove 11 formed in the outer circumferential face of the piston 10.

The high-pressure side rotation restriction part 22b engages with a high-pressure side rotation restriction groove 11d formed in the high-pressure side side-face 11a. Accordingly, rotation in the circumferential direction CD of the high-pressure side ring 22 is restricted with respect to the piston 10. As illustrated in FIG. 4, the high-pressure side rotation restriction part 22b is arranged at a position distant by 180 degrees in the circumferential direction CD from the high-pressure side abutment 22a.

As illustrated in FIG. 3 and FIG. 5, a low-pressure side protrusion 22c protruding toward the low-pressure side ring 21 and inserted in the low-pressure side abutment 21a is formed to the high-pressure side ring 22. As illustrated in FIG. 8, the low-pressure side protrusion 22c is inserted in the low-pressure side abutment 21a with clearances each having a length L1 being provided in both sides in the circumferential direction CD between the low-pressure side ring 21 and the low-pressure side protrusion 22c.

Each of the low-pressure side ring 21 and the high-pressure side ring 22 is restricted not to rotate in the circumferential direction CD with respect to the piston 10. As illustrated in FIG. 8, even when the piston 10 repeats reciprocation, the low-pressure side protrusion 22c and the low-pressure side ring 21 are maintained with the clearances of the length L1 being provided, respectively.

Herein, a comparative example to the present embodiment will be described. A piston ring of the comparative example to the present embodiment lacks at least either one of the low-pressure side rotation restriction part 21b and the high-pressure side rotation restriction part 22b, and rotation in the circumferential direction CD in either one of the low-pressure side ring 21 or the high-pressure side ring 22 is not restricted.

Since the piston ring of the comparative example is not restricted in the rotation in the circumferential direction CD of either one of the low-pressure side ring 21 or the high-pressure side ring 22, repetition of reciprocation of the piston 10 may lead to a state where the end on one side in the circumferential direction of the low-pressure side protrusion 22c and the low-pressure side ring 21 are in contact with each other, as illustrated by the broken line in FIG. 8. In such a case, the clearance between the end on one side in the circumferential direction of the low-pressure side protrusion 22c and the low-pressure side ring 21 will be a length L2 that is twice the length L1.

In the piston ring of the comparative example, a longer clearance between the end on one side in the circumferential direction CD of the low-pressure side protrusion 22c and the low-pressure side ring 21 causes an increased stress working on the high-pressure side ring 22 arranged at the position of the clearance. This is because the low-pressure side ring 21 is not present in the portion of the clearance and the pressure of the compressed fluid is thus applied to the high-pressure side ring 22 arranged at the position of the clearance. In contrast, in the piston ring 20 of the present embodiment, since rotation in the circumferential direction CD of the low-pressure side ring 21 and the high-pressure side ring 22 is restricted, the length of the clearance is maintained at the length L1.

The inner ring 23 is a member inserted in the groove 11 formed in the outer circumferential face 10b of the piston 10 and formed in an annular shape extending in the circumferential direction CD about the axis X. As illustrated in FIG. 3, the inner ring 23 has an inner abutment 23a whose arrangement is defined by a pair of ends of the inner ring 23 that are spaced apart from and face each other with a clearance therebetween in the circumferential direction CD.

As illustrated in FIG. 4 and FIG. 5, the inner ring 23 has an outer circumferential face arranged in contact with the inner circumferential face of the low-pressure side ring 21 and the inner circumferential face of the high-pressure side ring 22. The inner ring 23 transmits radially outward pushing force, which is applied from the backup ring 24, to both the low-pressure side ring 21 and the high-pressure side ring 22 evenly at respective positions in the circumferential direction CD.

As illustrated in FIG. 3 and FIG. 4, an inner rotation restriction part 23b that restricts rotation in the circumferential direction CD relative to the piston 10 is formed to the inner ring 23. As illustrated in FIG. 10 and FIG. 11, the inner rotation restriction part 23b has a shape protruding toward the high-pressure side side-face 11a of the groove 11 formed in the outer circumferential face of the piston 10 and engages with the inner rotation restriction groove 11e formed in the high-pressure side side-face 11a. Accordingly, rotation in the circumferential direction CD of the inner ring 23 is restricted with respect to the piston 10. As illustrated in FIG. 4, the inner rotation restriction part 23b is arranged at a position distant by 180 degrees in the circumferential direction CD from the inner abutment 23a.

As illustrated in FIG. 5 and FIG. 11, a recess 23c recessed radially inward is formed in the outer circumferential face of the inner ring 23. The low-pressure side ring rotation restriction part 21b of the low-pressure side ring 21 is engaged with the recess 23c. The low-pressure side ring 21 engaged with the recess 23c is restricted not to rotate in the circumferential direction CD with respect to the inner ring 23.

The backup ring 24 is a member inserted in the groove 11 formed in the outer circumferential face 10b of the piston 10 and formed in an annular shape extending in the circumferential direction CD about the axis X. As illustrated in FIG. 3, the backup ring 24 has an abutment 24a whose arrangement is defined by a pair of ends of the backup ring 24 that are spaced apart from and face each other with a clearance therebetween in the circumferential direction CD.

As illustrated in FIG. 4 and FIG. 5, the backup ring 24 has the outer circumferential face arranged in contact with the inner circumferential face of the inner ring 23. The backup ring 24 is formed elastically, deformably of a metal material and applies radially outward pushing force to the inner ring 23 at respective positions in the circumferential direction CD.

Effects and advantages achieved by the piston ring 20 of the present embodiment described above will be described.

According to the piston ring 20 of the present embodiment, rotation of the low-pressure side ring 21 in the circumferential direction CD relative to the piston 10 is restricted by the low-pressure side rotation restriction part 21b, and rotation of the high-pressure side ring 22 in the circumferential direction CD relative to the piston 10 is restricted by the high-pressure side rotation restriction part 22b. Thus, even when the piston 10 repeats reciprocation, the positions in the circumferential direction CD of the low-pressure side ring 21 and the high-pressure side ring 22 can be maintained.

Since the positions in the circumferential direction CD of the low-pressure side ring 21 and the high-pressure side ring 22 are maintained, a state where the low-pressure side protrusion 22c of the high-pressure side ring 22 has clearances on both sides in the circumferential direction CD between the low-pressure side ring 21 and the low-pressure side protrusion 22c is maintained even when the piston 10 repeats reciprocation. It is therefore possible to prevent the low-pressure side protrusion 22c of the high-pressure side ring 22 inserted in the low-pressure side abutment 21a of the low-pressure side ring 21 from being arranged shifted to one side in the circumferential direction CD and thereby prevent a fatigue failure due to stress concentration in some region of the high-pressure side ring 22.

According to the piston ring 20 of the present embodiment, rotation of the inner ring 23 in the circumferential direction CD relative to the piston 10 is restricted by the inner rotation restriction part 23b. Thus, rotation of the low-pressure side ring 21 in the circumferential direction CD relative to the piston 10 can be restricted by engagement of the low-pressure side rotation restriction part 21b with the recess 23c formed in the outer circumferential face of the inner ring 23.

Second Embodiment

Next, a booster pump according to a second embodiment of the present disclosure will be described with reference to the drawings. The present embodiment is a modified example to the first embodiment and is the same as the first embodiment except as specifically described below, and the description thereof will be omitted in the following.

The piston ring 20 of the booster pump 100 of the first embodiment is formed such that the low-pressure side ring 21 is formed of a single member having a single low-pressure side abutment 21a and the high-pressure side ring 22 is formed of a single member having a single high-pressure side abutment 22a. In contrast, in a piston ring 20A of the booster pump of the present embodiment, the low-pressure side ring 21 is formed of two members divided by two low-pressure side abutments 21a, the high-pressure side ring 22 is formed of two members divided by two high-pressure side abutments 22a, and the inner ring 23 is formed of two members divided by two inner abutments 23a.

Figure 12:
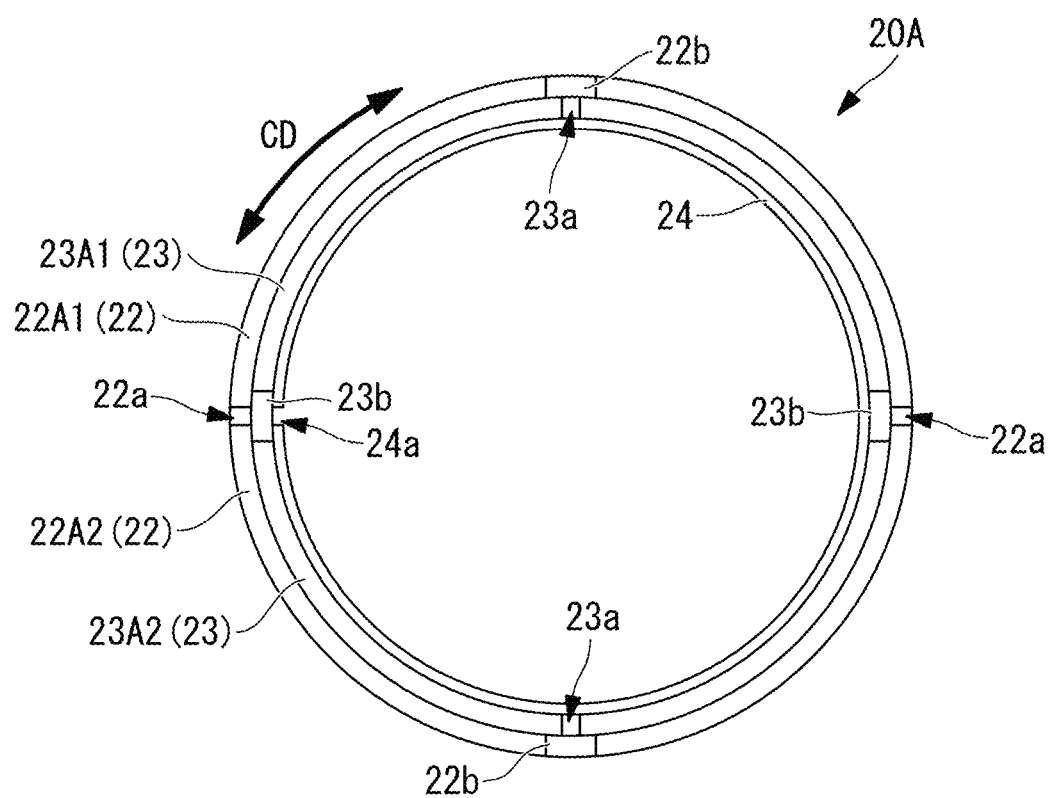
FIG. 12 is a plan view of a piston ring according to a second embodiment of the present disclosure when viewed from the high-pressure side ring side.
Figure 13:
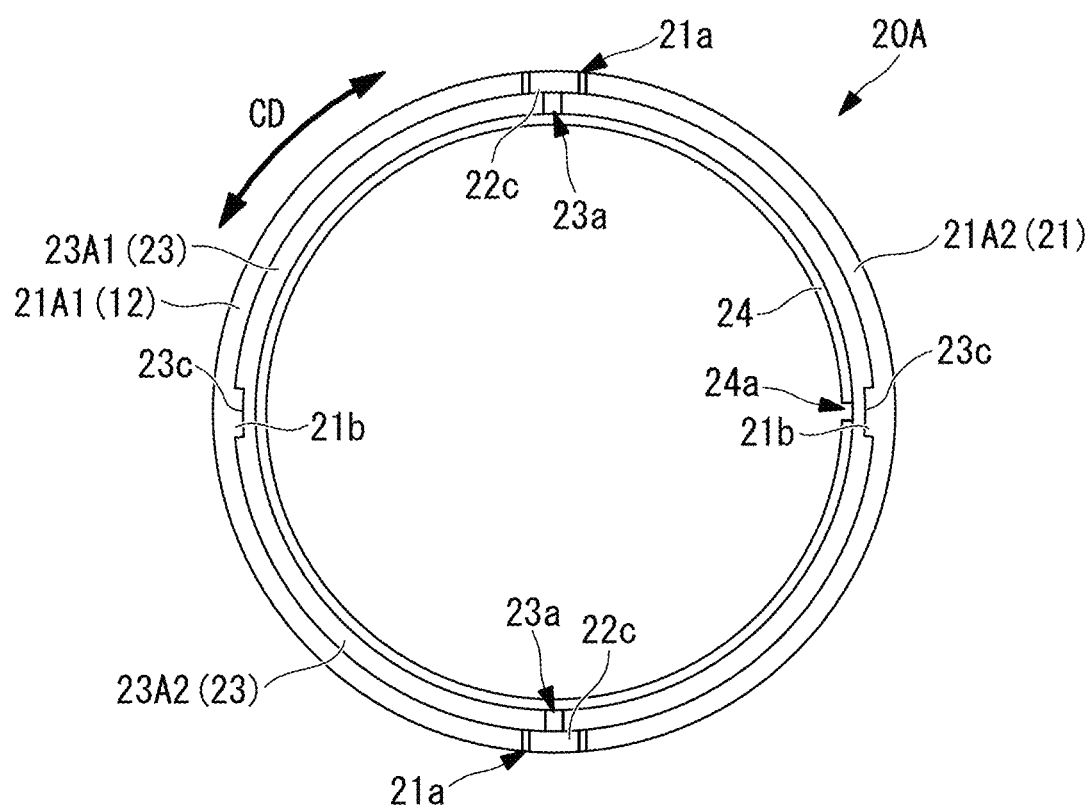
FIG. 13 is a plan view of the piston ring according to the second embodiment of the present disclosure when viewed from the low-pressure side ring side.

FIG. 12 is a plan view of the piston ring 20A according to the present embodiment of the disclosure when viewed from the high-pressure side ring 22 side. FIG. 13 is a plan view of the piston ring 20A according to the present embodiment when viewed from the low-pressure side ring 21 side.

As illustrated in FIG. 12, the high-pressure side ring 22 of the present embodiment is divided into two high-pressure side members 22A1, 22A2 by two high-pressure side abutments 22a arranged apart from each other by 180 degrees in the circumferential direction CD. As illustrated in FIG. 12 and FIG. 13, the high-pressure side rotation restriction part 22b and the low-pressure side protrusion 22c are formed to the high-pressure side member 22A1 and the high-pressure side member 22A2, respectively.

As illustrated in FIG. 12 and FIG. 13, the inner ring 23 of the present embodiment is divided into two inner members 23A1, 23A2 by two inner abutments 23a arranged apart from each other by 180 degrees in the circumferential direction CD. The inner rotation restriction part 23b and the recess 23c are formed to the inner member 23A1 and the inner member 23A2, respectively.

As illustrated in FIG. 13, the low-pressure side ring 21 of the present embodiment is divided into two low-pressure side member 21A1, 21A2 by two low-pressure side abutments 21a arranged apart from each other by 180 degrees in the circumferential direction CD. The low-pressure side rotation restriction parts 21b are formed to the low-pressure side member 21A1 and the low-pressure side member 21A2, respectively.

The length (clearance) in the circumferential direction CD of the low-pressure side abutment 21a provided in a single low-pressure side ring 21 is defined to a constant length taking an amount of shrinkage due to a low temperature fluid or the like into consideration. Although the low-pressure side ring 21 of the first embodiment has only one low-pressure side abutment 21a, the low-pressure side ring 21 of the present embodiment has two low-pressure side abutments 21a. Thus, the length in the circumferential direction CD of the low-pressure side abutment 21a of the low-pressure side ring 21 of the present embodiment can be half the length in the circumferential direction CD of the low-pressure side abutment 21a of the low-pressure side ring 21 of the first embodiment.

According to the present embodiment, the length in the circumferential direction CD of the low-pressure side abutment 21a of the low-pressure side ring 21 can be shorter than that in the first embodiment. Thus, the stress due to a pressure of a low temperature fluid working on the high-pressure side ring 22 arranged to the low-pressure side abutments 21a can be reduced compared to the case of the low-pressure side ring 21 of the first embodiment.

Although the piston ring 20A is configured in the above description such that the low-pressure side ring 21 is formed of two members divided by the two low-pressure side abutments 21a, the high-pressure side ring 22 is formed of two members divided by the two high-pressure side abutments 22a, and the inner ring 23 is formed of two members divided by the two inner abutments 23a, other forms may be employed.

For example, the piston ring 20A may be configured such that the low-pressure side ring 21 is formed of a predetermined number of low-pressure side members divided by the predetermined number of low-pressure side abutments 21a, where the predetermined number is two or greater, the high-pressure side ring 22 is formed of the predetermined number of high-pressure side members divided by the predetermined number of high-pressure side abutments 22a, and the inner ring 23 is formed of the predetermined number of inner members divided by the predetermined number of inner abutments 23a.

In such a case, the high-pressure side rotation restriction parts 22b and the low-pressure side protrusions 22c are formed to the predetermined number of high-pressure side members, respectively. Further, the inner rotation restriction parts 23b and the recesses 23c are formed to the predetermined number of inner members, respectively. Further, the low-pressure side rotation restriction parts 21b are formed to the predetermined number of low-pressure side members, respectively.

Third Embodiment

Next, a booster pump according to a third embodiment of the present disclosure will be described with reference to the drawings. The present embodiment is a modified example to the first embodiment and is the same as the first embodiment except as specifically described below, and the description thereof will be omitted in the following.

In the piston ring 20 of the booster pump 100 of the first embodiment, the rotation in the circumferential direction CD of the high-pressure side ring 22 is restricted by the high-pressure side rotation restriction part 22b. In contrast, in a piston ring 20B of the booster pump of the present embodiment, rotation in the circumferential direction CD of the high-pressure side ring 22 is restricted by both the high-pressure side rotation restriction part 22b and the low-pressure side protrusion 22c.

Figure 14:
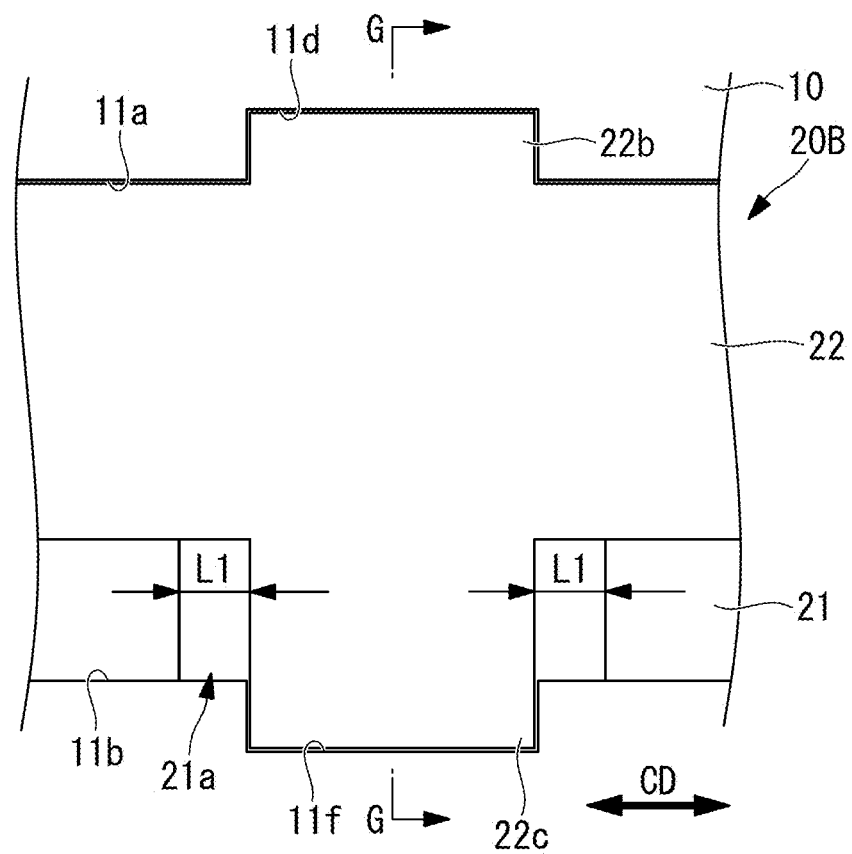
FIG. 14 is a diagram of a piston ring according to a third embodiment of the present disclosure when viewed along a radial direction.
Figure 15:
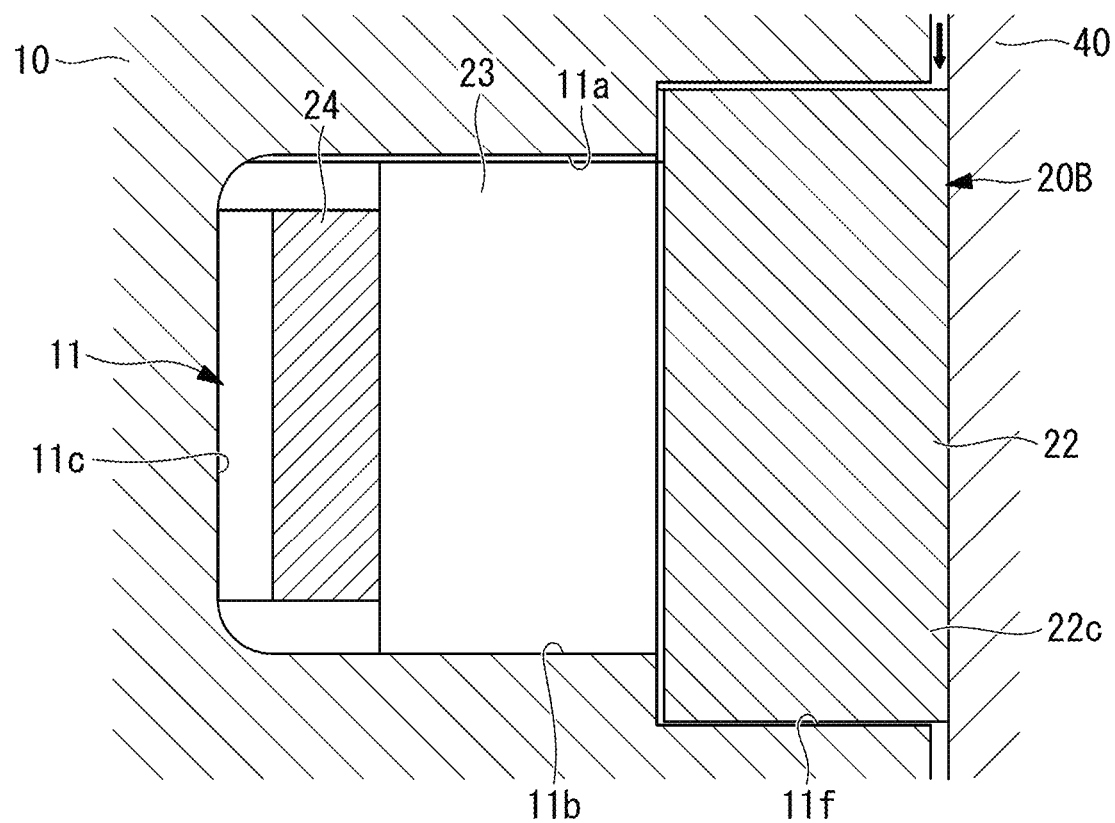
FIG. 15 is an arrow G-G sectional view of the piston ring illustrated in FIG. 14.

FIG. 14 is a diagram of the piston ring 20B according to the present embodiment when viewed along the radial direction. FIG. 15 is an arrow G-G sectional view of the piston ring illustrated in FIG. 14. As illustrated in FIG. 14 and FIG. 15, the low-pressure side protrusion 22c of the high-pressure side ring 22 of the piston ring 20B of the present embodiment has a shape that engages with a low-pressure side rotation restriction groove 11f formed in the low-pressure side side-face 11b of the groove 11. The low-pressure side rotation restriction groove 11f is formed in the low-pressure side side-face 11b facing the low-pressure side ring 21 and is formed so as to extend in the radial direction orthogonal to the axis X.

According to the piston ring 20B of the present embodiment, rotation of the high-pressure side ring 22 in the circumferential direction CD can be restricted by engagement of the low-pressure side protrusion 22c of the high-pressure side ring 22 with the low-pressure side rotation restriction groove 11f formed in the low-pressure side side-face 11b. Since rotation of the high-pressure side ring 22 in the circumferential direction CD is restricted by both the high-pressure side rotation restriction part 22b and the low-pressure side protrusion 22c, the stress occurring in the high-pressure side rotation restriction part 22b can be reduced compared to a case where the rotation is restricted by only the high-pressure side rotation restriction part 22b.

Fourth Embodiment

Next, a booster pump according to a fourth embodiment of the present disclosure will be described with reference to the drawings. The present embodiment is a modified example to the first embodiment and is the same as the first embodiment except as specifically described below, and the description thereof will be omitted in the following.

The piston ring 20 of the booster pump 100 of the first embodiment includes the high-pressure side rotation restriction part 22b having a shape protruding toward the high-pressure side side-face 11a of the groove 11 facing the high-pressure side ring 22. In contrast, a piston ring 20C of the booster pump of the present embodiment includes a high-pressure side rotation restriction part 22d having a shape recessed toward the low-pressure side side-face 11b of the groove 11.

Figure 16:
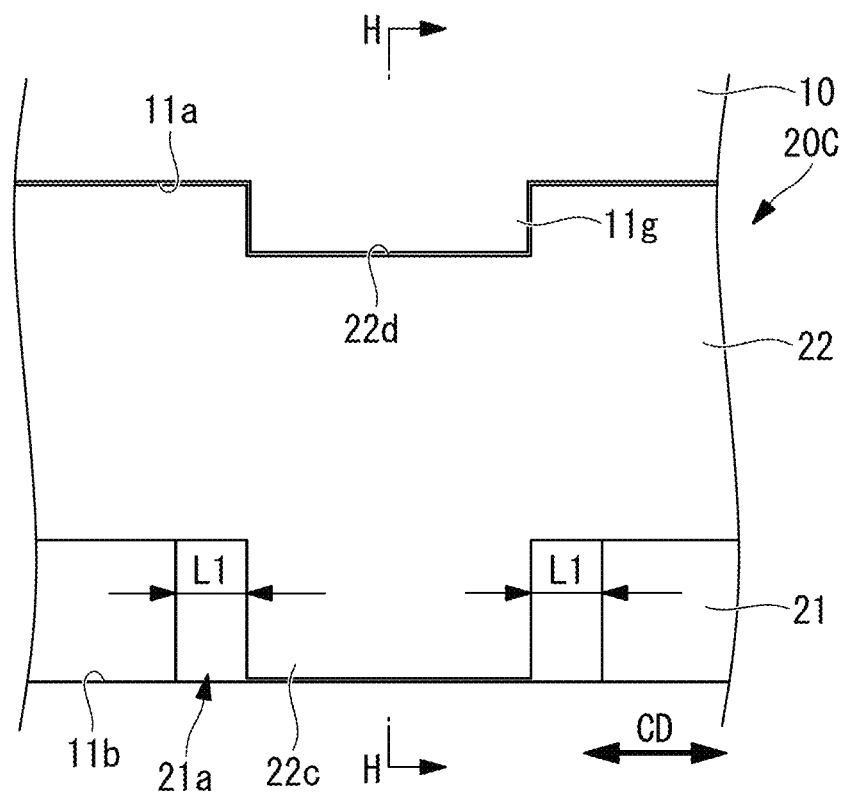
FIG. 16 is a diagram of a piston ring according to a fourth embodiment of the present disclosure when viewed along a radial direction.
Figure 17:
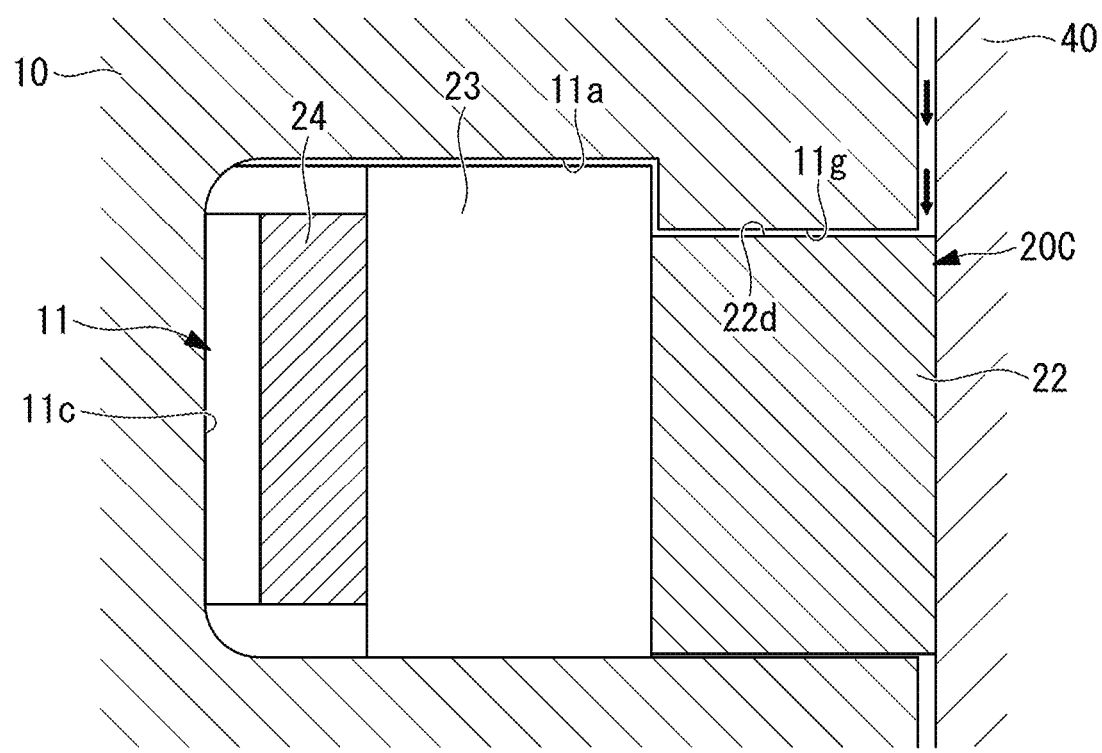
FIG. 17 is an arrow H-H sectional view of the piston ring illustrated in FIG. 16.

FIG. 16 is a diagram of the piston ring 20C according to the present embodiment when viewed along the radial direction. FIG. 17 is an arrow H-H sectional view of the piston ring illustrated in FIG. 16. As illustrated in FIG. 16 and FIG. 17, the piston ring 20C includes the high-pressure side rotation restriction part 22d having a shape recessed toward the low-pressure side side-face 11b of the groove 11. The high-pressure side rotation restriction part 22d is arranged so as to engage with a protrusion 11g protruding toward the high-pressure side ring 22 from the high-pressure side side-face 11a of the groove 11. The protrusion 11g is formed so as to extend in the radial direction orthogonal to the axis X.

Rotation in the circumferential direction CD of the high-pressure side ring 22 is restricted by engagement of the high-pressure side rotation restriction part 22d with the protrusion 11g. Thus, even when the piston 10 repeats reciprocation, the positions in the circumferential direction CD of the low-pressure side ring 21 and the high-pressure side ring 22 can be maintained.

The piston rings according to the present embodiments described above are understood as follows, for example.

The piston ring (20) according to the present disclosure includes: a low-pressure side ring (21) inserted in a groove (11) formed in an outer circumferential face of the piston (10) formed in a cylindrical shape along an axis (X), formed in an annular shape extending in a circumferential direction (CD) about the axis, and having a low-pressure side abutment (21a); and a high-pressure side ring (22) inserted in the groove, formed in an annular shape extending in the circumferential direction, and having a high-pressure side abutment (22a). The low-pressure side ring and the high-pressure side ring are arranged stacked in a direction along the axis so that the high-pressure side ring is closer to a fluid to be compressed, a low-pressure side rotation restriction part (21b) configured to restrict rotation in the circumferential direction relative to the piston is formed to the low-pressure side ring, a high-pressure side rotation restriction part (22b) configured to restrict rotation in the circumferential direction relative to the piston and a low-pressure side protrusion (22c) protruding toward the low-pressure side ring and inserted in the low-pressure side abutment are formed to the high-pressure side ring, and the low-pressure side protrusion is inserted in the low-pressure side abutment with clearances being provided in both sides in the circumferential direction between the low-pressure side ring and the low-pressure side protrusion.

According to the piston ring of the present disclosure, rotation of the low-pressure side ring in the circumferential direction relative to the piston is restricted by the low-pressure side rotation restriction part, and rotation of the high-pressure side ring in the circumferential direction relative to the piston is restricted by the high-pressure side rotation restriction part. Thus, even when the piston repeats reciprocation, the positions in the circumferential direction of the low-pressure side ring and the high-pressure side ring can be maintained. Since the positions in the circumferential direction of the low-pressure side ring and the high-pressure side ring are maintained, a state where the low-pressure side protrusion of the high-pressure side ring has clearances on both sides in the circumferential direction between the low-pressure side ring and the low-pressure side protrusion is maintained even when the piston repeats reciprocation. It is therefore possible to prevent the low-pressure side protrusion of the high-pressure side ring inserted in the low-pressure side abutment of the low-pressure side ring from being arranged shifted circumferentially to one side and thereby prevent a fatigue failure due to stress concentration in some region of the high-pressure side ring.

The piston ring according to the present disclosure may be configured such that the high-pressure side rotation restriction part has a shape protruding toward a high-pressure side side-face (11a) facing the high-pressure side ring of the groove and engages with a high-pressure side rotation restriction groove (11d) formed in the high-pressure side side-face and extending in a radial direction (RD) orthogonal to the axis (X).

According to the piston ring of the present configuration, rotation of the high-pressure side ring in the circumferential direction can be restricted by engagement of the high-pressure side rotation restriction part, which has a shape protruding toward the high-pressure side side-face in the groove formed in the piston, with the high-pressure side rotation restriction groove formed in the high-pressure side side-face.

The piston ring of the above configuration may be configured such that the low-pressure side protrusion engages with a low-pressure side rotation restriction groove (11f) formed in a low-pressure side side-face (11b) of the groove and extending in a radial direction (RD) orthogonal to the axis, the low-pressure side side-face (11b) facing the low-pressure side ring.

According to the piston ring of the present configuration, rotation of the high-pressure side ring in the circumferential direction can be restricted by engagement of the low-pressure side protrusion of the high-pressure side ring with the low-pressure side rotation restriction groove formed in the low-pressure side side-face. Since rotation of the high-pressure side ring in the circumferential direction is restricted by both the high-pressure side rotation restriction part and the low-pressure side protrusion, the stress occurring in the high-pressure side rotation restriction part can be reduced compared to a case where the rotation is restricted by only the high-pressure side rotation restriction part.

The piston ring according to the present disclosure may have an inner ring (23) that is formed in an annular shape extending in the circumferential direction about the axis and has an outer circumferential face arranged in contact with an inner circumferential face of the low-pressure side ring and an inner circumferential face of the high-pressure side ring and may be configured such that an inner rotation restriction part (23b) configured to restrict rotation in the circumferential direction relative to the piston is formed to the inner ring, a recess (23c) is formed in an outer circumferential face of the inner ring, and the low-pressure side rotation restriction part has a shape protruding toward an outer circumferential face of the inner ring and engages with the recess.

According to the piston ring of the present configuration, since rotation of the inner ring in the circumferential direction relative to the piston is restricted by the inner rotation restriction part, rotation of the low-pressure side ring in the circumferential direction relative to the piston can be restricted by engagement of the low-pressure side rotation restriction part with the recess formed in the outer circumferential face of the inner ring.

The piston ring of the above configuration may be configured such that the inner rotation restriction part has a shape protruding toward a high-pressure side side-face of the groove and engages with an inner rotation restriction groove (11e) formed in the high-pressure side side-face and extending in a radial direction orthogonal to the axis, the high-pressure side side-face facing the high-pressure side ring.

According to the piston ring of the present configuration, rotation of the inner ring in the circumferential direction can be restricted by engagement of the inner rotation restriction part, which has a shape protruding toward the high-pressure side side-face of the groove formed in the piston, with the inner rotation restriction groove formed in the high-pressure side side-face.

The piston ring according to the present disclosure may be configured such that the low-pressure side ring (21) is divided into a predetermined number of low-pressure side members (21A1, 21A2) by the predetermined number of low-pressure side abutments, the predetermined number being two or greater, the low-pressure side rotation restriction part is formed to each of the predetermined number of low-pressure side members, and the predetermined number of low-pressure side protrusions are formed to the high-pressure side ring.

According to the piston ring of the present configuration, since a predetermined number, which is two or greater, of low-pressure side abutments are provided in the low-pressure side ring, the length of the clearances in the circumferential direction of the abutment due to thermal contraction (opening amount) can be reduced compared to a case where a single low-pressure side abutment is provided. Accordingly, the region of the high-pressure side ring arranged in the clearance of the low-pressure side ring is narrower, and the stress partially working on the high-pressure side ring can be reduced.

The booster pump according to the embodiments described above is understood as follows, for example.

The booster pump according to the present disclosure includes: a piston (10) formed in a cylindrical shape along an axis and configured to reciprocate along the axis to compress a fluid; and the piston ring (20) according to any one of the above inserted in a groove formed in an outer circumferential face of the piston.

According to the booster pump of the present disclosure, rotation of the low-pressure side ring in the circumferential direction relative to the piston is restricted by the low-pressure side rotation restriction part, and rotation of the high-pressure side ring in the circumferential direction relative to the piston is restricted by the high-pressure side rotation restriction part. Thus, even when the piston repeats reciprocation, the positions in the circumferential direction of the low-pressure side ring and the high-pressure side ring are maintained. Since the positions in the circumferential direction of the low-pressure side ring and the high-pressure side ring are maintained, a state where the low-pressure side protrusion of the high-pressure side ring has clearances on both sides in the circumferential direction between the low-pressure side ring and the low-pressure side protrusion is maintained even when the piston repeats reciprocation. It is therefore possible to prevent the low-pressure side protrusion of the high-pressure side ring inserted in the low-pressure side abutment of the low-pressure side ring from being arranged shifted circumferentially to one side and thereby prevent a fatigue failure due to stress concentration in some region of the high-pressure side ring.

REFERENCE SIGNS LIST 10 piston
10b outer circumferential face
11 groove
11a high-pressure side side-face
11b low-pressure side side-face
11c bottom face
11d high-pressure side rotation restriction groove
11e inner rotation restriction groove
11f low-pressure side rotation restriction groove
11g protrusion
20, 20A, 20B, 20C piston ring
21 low-pressure side ring
21A1, 21A2 low-pressure side member
21a low-pressure side abutment
21b low-pressure side rotation restriction part
22 high-pressure side ring
22A1, 22A2 high-pressure side member
22a high-pressure side abutment
22b high-pressure side rotation restriction part
22c low-pressure side protrusion
22d high-pressure side rotation restriction part
23 inner ring
23a inner abutment
23b inner rotation restriction part
23c recess
24 backup ring
24a abutment
30 piston rod
40 cylinder block
100 booster pump
CD circumferential direction
CL cylinder
CS compression chamber
RDa, RDb. RDc radial direction
X axis

The invention claimed is:

1. A piston ring to be attached to a piston, the piston being formed in a cylindrical shape along an axis and configured to reciprocate along the axis to compress a fluid, the piston ring comprising:
   a low-pressure side ring inserted in a groove formed in an outer circumferential face of the piston, formed in an annular shape extending in a circumferential direction about the axis, and having a low-pressure side abutment; and
   a high-pressure side ring inserted in the groove, formed in an annular shape extending in the circumferential direction, and having a high-pressure side abutment,
   wherein the low-pressure side ring and the high-pressure side ring are arranged stacked in a direction along the axis so that the high-pressure side ring is closer to a fluid to be compressed,
   wherein a low-pressure side rotation restriction part configured to restrict rotation in the circumferential direction relative to the piston is formed on the low-pressure side ring, the low-pressure side rotation restriction part being arranged at a position different from the low-pressure side abutment in the circumferential direction,
   wherein a high-pressure side rotation restriction part configured to restrict rotation in the circumferential direction relative to the piston and a low-pressure side protrusion protruding toward the low-pressure side ring and inserted in the low-pressure side abutment are formed on the high-pressure side ring, the high-pressure side rotation restriction part and the low-pressure side protrusion being arranged at a position different from the high-pressure side abutment in the circumferential direction, and
   wherein the low-pressure side protrusion is inserted in the low-pressure side abutment with clearances being provided in both sides in the circumferential direction between the low-pressure side ring and the low-pressure side protrusion.

2. The piston ring according to claim 1, wherein the high-pressure side rotation restriction part has a shape protruding toward a high-pressure side side-face facing the high-pressure side ring of the groove and engages with a high-pressure side rotation restriction groove faces the high-pressure side side-face and extending in a radial direction orthogonal to the axis.

3. The piston ring according to claim 2, wherein the low-pressure side protrusion engages with a low-pressure side rotation restriction groove formed in a low-pressure side side-face of the groove and extending in a radial direction orthogonal to the axis, the low-pressure side side-face facing the low-pressure side ring.

4. The piston ring according to claim 1, further comprising an inner ring that is formed in an annular shape extending in the circumferential direction about the axis and has an outer circumferential face arranged in contact with an inner circumferential face of the low-pressure side ring and an inner circumferential face of the high-pressure side ring,
   wherein an inner rotation restriction part configured to restrict rotation in the circumferential direction relative to the piston is formed in the inner ring,
   wherein a recess is formed in an outer circumferential face of the inner ring, and
   wherein the low-pressure side rotation restriction part has a shape protruding toward an outer circumferential face of the inner ring and engages with the recess.

5. The piston ring according to claim 4, wherein the inner rotation restriction part has a shape protruding toward a high-pressure side side-face of the groove and engages with an inner rotation restriction groove formed in the high-pressure side side-face and extending in a radial direction orthogonal to the axis, the high-pressure side side-face facing the high-pressure side ring.

6. The piston ring according to claim 1,
   wherein the low-pressure side ring is divided into at least two low-pressure side members by at least two low-pressure side abutments,
   wherein at least one low-pressure side rotation restriction part comprises at least two low-pressure side rotation restriction parts, wherein each low-pressure side rotation restriction part is formed on a respective one of the at least two low-pressure side members, and
   wherein at least two low-pressure side protrusions are formed on the high-pressure side ring.

7. A booster pump comprising:
a piston formed in a cylindrical shape along an axis and configured to reciprocate along the axis to compress a fluid; and
the piston ring according to claim 1 inserted in a groove formed in an outer circumferential face of the piston.

* * * * *